INVENTOR.
Irving M. Archer
BY
ATTORNEY

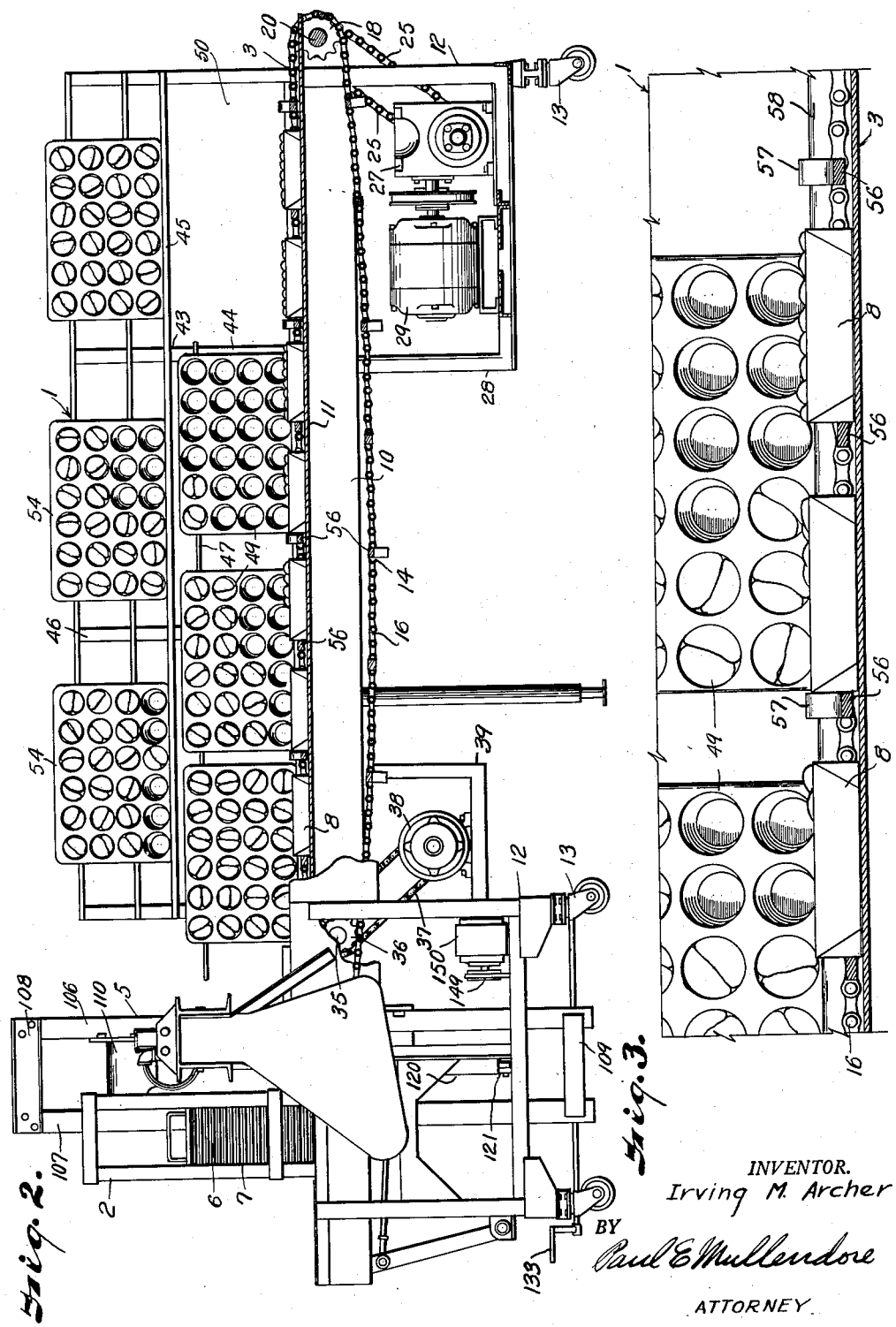

Jan. 31, 1961 I. M. ARCHER 2,969,633
APPARATUS FOR FACILITATING REMOVAL OF BAKERY PRODUCTS SUCH
AS ROLLS FROM BAKING PANS AND PACKING THEREOF IN CARTONS
Filed March 21, 1958 6 Sheets-Sheet 3
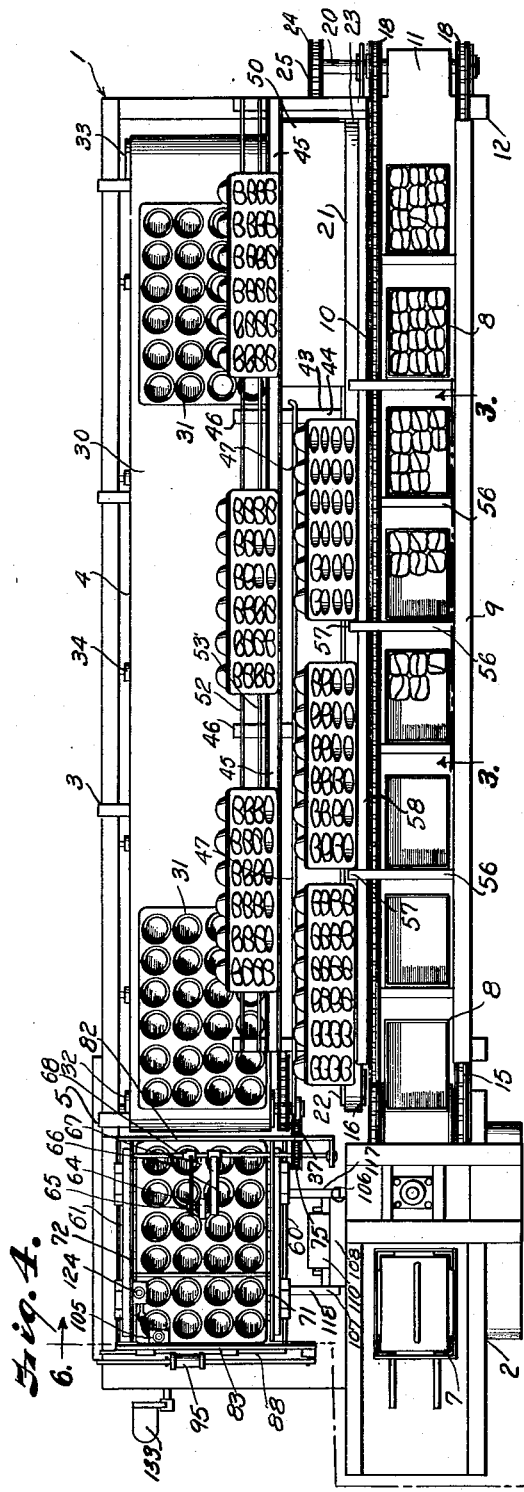
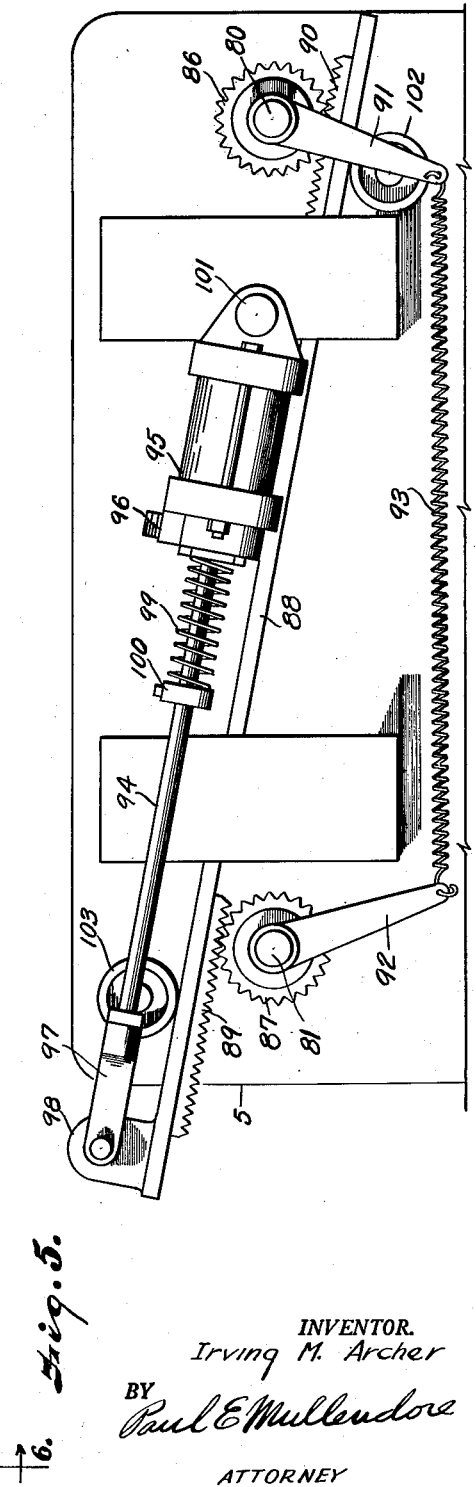
INVENTOR.
Irving M. Archer
BY
Paul E. Mullendore
ATTORNEY

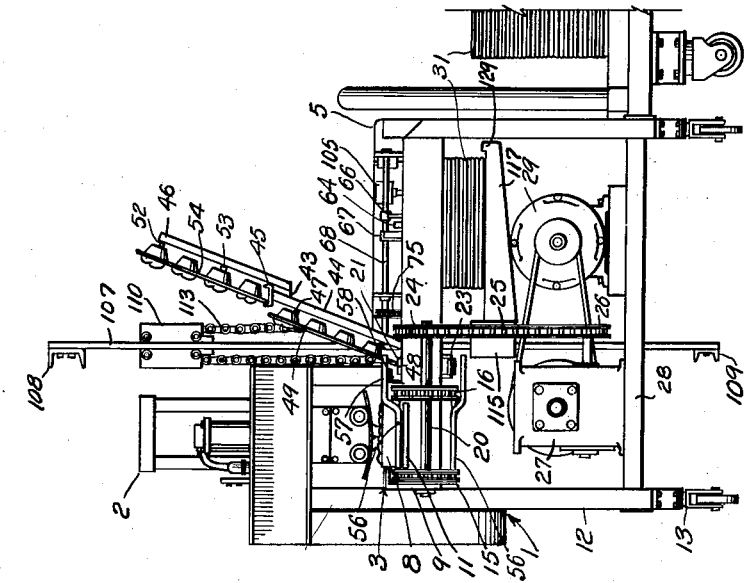

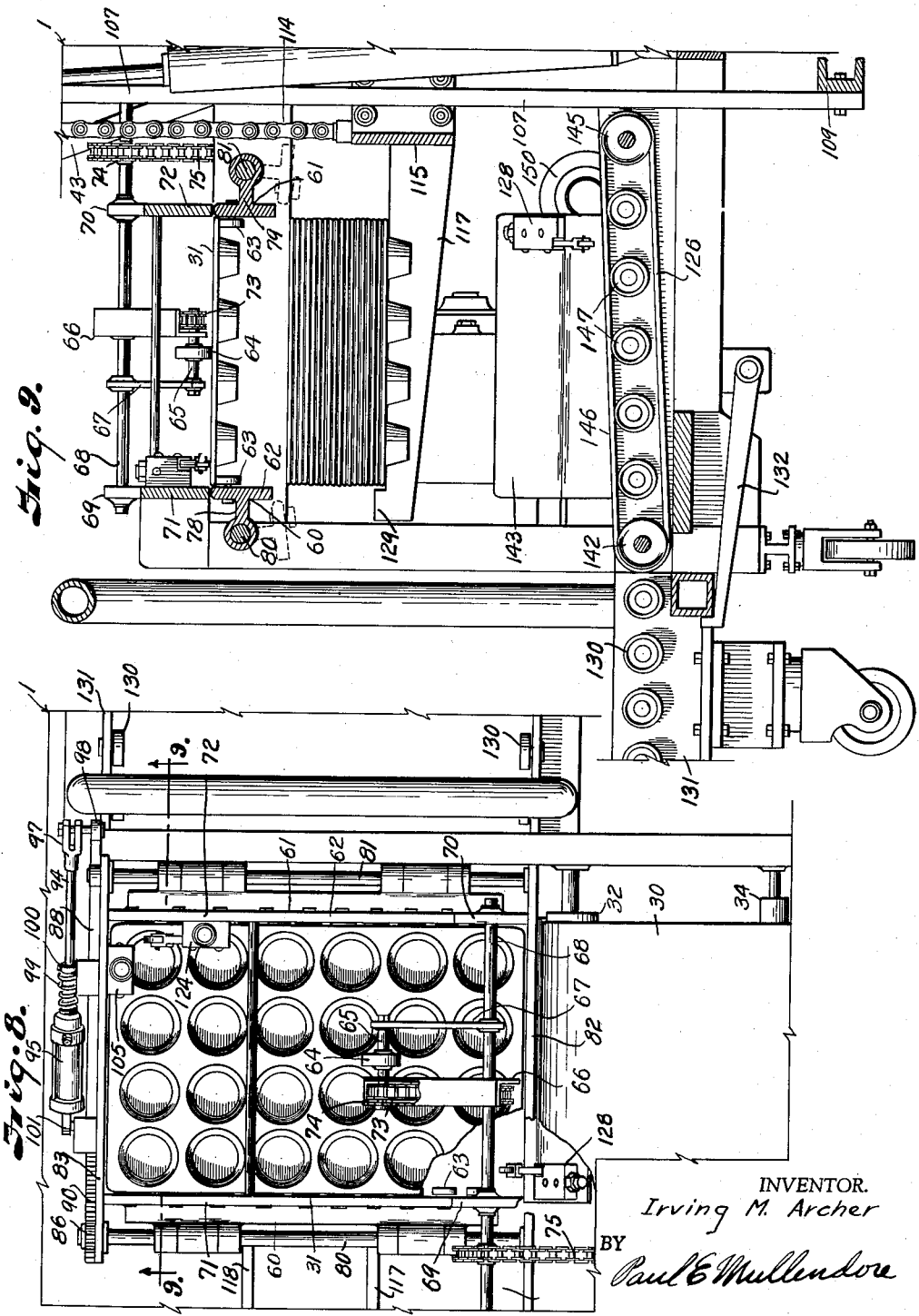

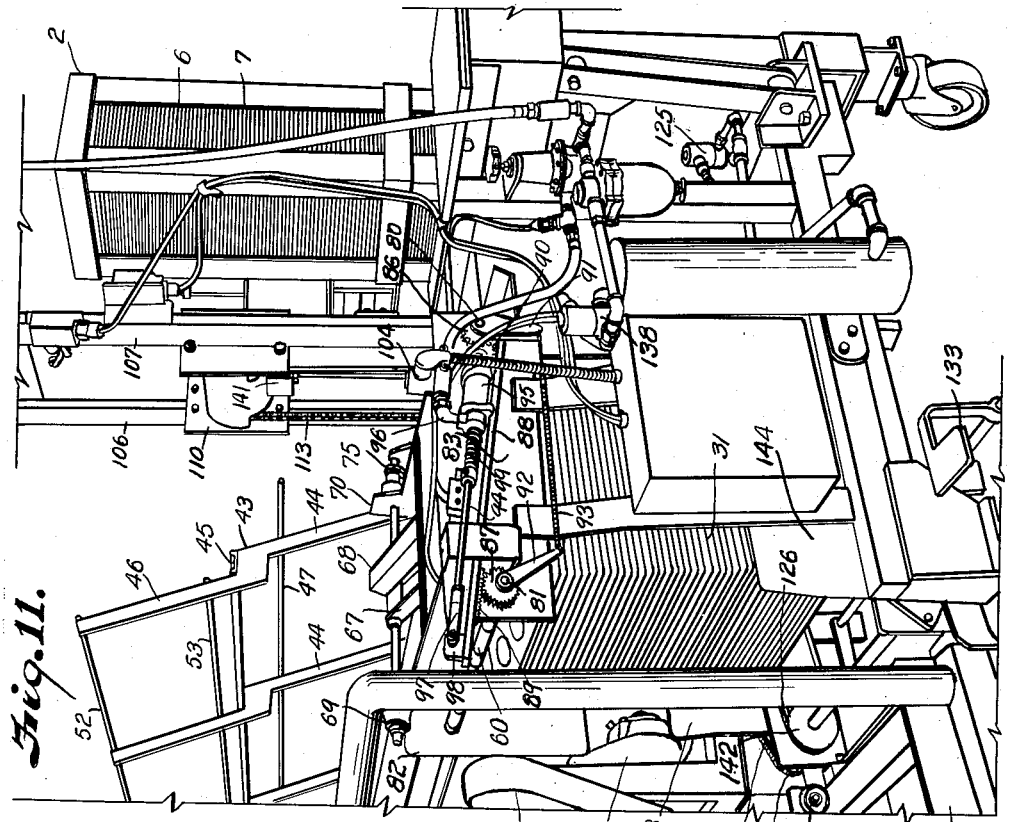

United States Patent Office 2,969,633
Patented Jan. 31, 1961

2,969,633

APPARATUS FOR FACILITATING REMOVAL OF BAKERY PRODUCTS SUCH AS ROLLS FROM BAKING PANS AND PACKING THEREOF IN CARTONS

Irving M. Archer, Dallas, Tex., assignor to Campbell Taggart Associated Bakeries, Inc., Dallas, Tex., a corporation of Delaware Filed Mar. 21, 1958, Ser. No. 723,025

13 Claims. (Cl. 53—391)

This invention relates to an apparatus for packaging rolls, and particularly partially baked rolls known as "Brown 'N Serve" rolls. Such rolls are prepared in a bakery and are baked to the point of browning. They are then placed in cartons and the cartons wrapped with a transparent wrapper for sale, principally in super markets. When the rolls are taken home by the purchaser, they are placed in the oven to be heated and browned.

The packing of such rolls offers a problem to the bakery because the partially baked rolls have fragile shells, and must be removed from the pans by hand and placed in the cartons without crushing. Such rolls have become very popular and must be packed in large quantities, so that handling of the pans and cartons at the required speed becomes a labor problem.

It is, therefore, a principal object of the present invention to provide an apparatus for conveying the cartons and baking pans containing the rolls in synchronism along a packing station, whereby the packers may rapidly remove the rolls from the pans and place them in the cartons without danger of crushing the shells.

Other objects of the invention are to provide an apparatus of this character whereby the cartons are moved from a carton erecting mechanism in continuous order through the packing station and to a wrapping mechanism; to provide for movement of the filled pans in rearwardly reclining position along the packing station to permit the use of both hands of a packer in removal of the rolls from the pans; to provide an auxiliary stationary support for one or more filled pans from which rolls are removed to replace "crippled" or crushed rolls; and to provide automatic means for removing and stacking the empty pans.

In accomplishing these and other objects of the invention, I have provided improved structure, the preferred form of which is illustrated in the accompanying drawings, wherein;

Fig. 2 is a front elevational view of the apparatus.

Fig. 3 is a fragmentary longitudinal section on the line 3—3 of Fig. 4.

Fig. 4 is a plan view of the apparatus.

Fig. 5 is an enlarged fragmentary view of the actuating means for supporting an empty pan and depositing the empty pans in a stack for removal.

Fig. 6 is a transverse section through the apparatus on the line 6—6 of Fig. 4.

Fig. 7 is an end view of the apparatus.

Fig. 8 is an enlarged plan view of the pan stacking end of the apparatus.

Fig. 9 is a section on the line 9—9 of Fig. 8.

Fig. 10 is a fragmentary perspective view on the upper cross head of the pan elevator and guides therefor.

Fig. 11 is a perspective view of the pan stacking mechanism.

Fig. 12 is a fragmentary view of the switch mechanism for effecting lift of the pan elevator.

Figure 1:
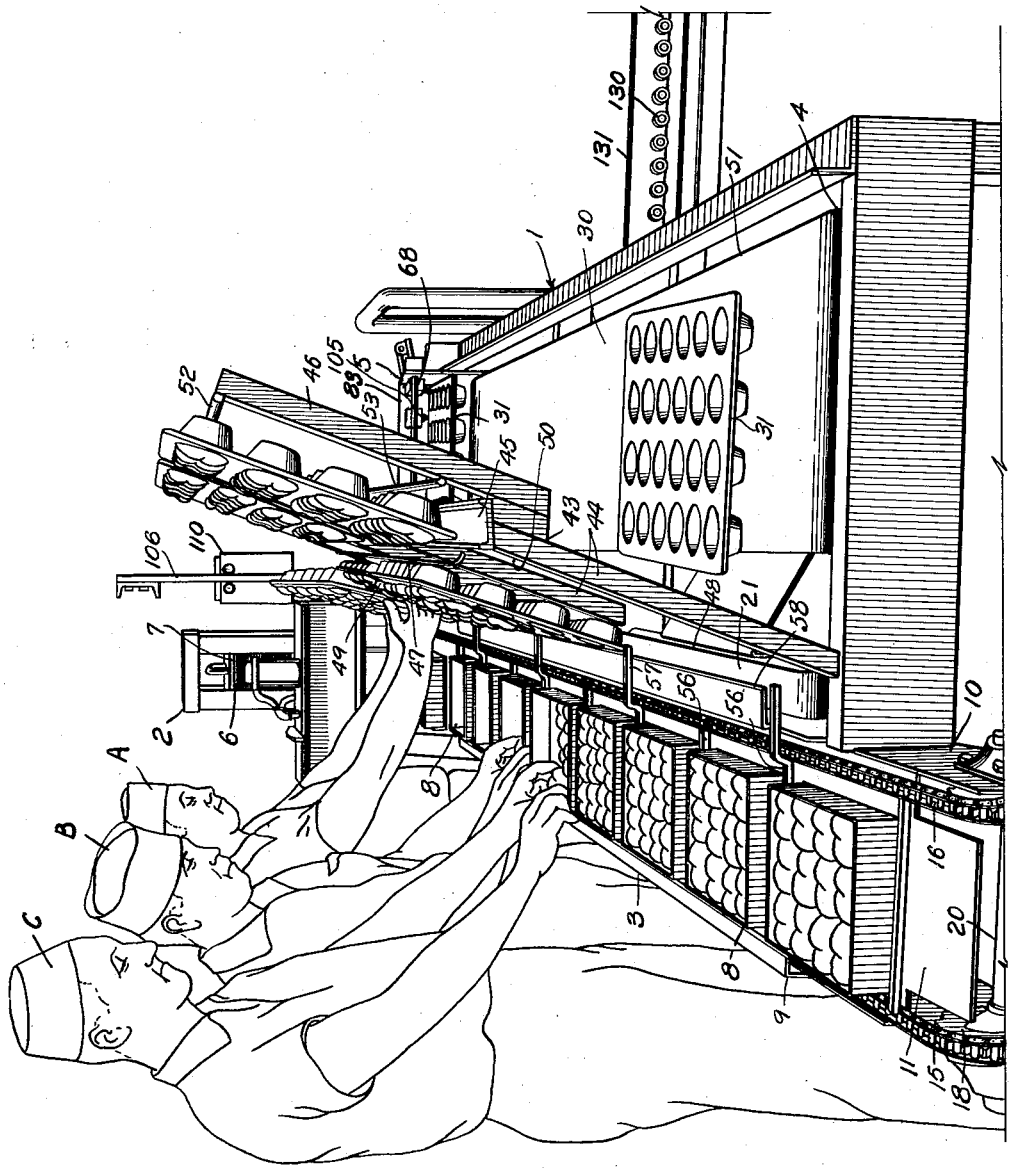
Fig. 1 is a perspective view of an apparatus constructed in accordance with the present invention.

Referring more in detail to the drawings:

1 designates an apparatus constructed in accordance with the present invention for mechanically handling the baking pans and cartons to facilitate removal of rolls from the baking pans and placing them in the cartons in which they are sold. The apparatus includes a carton erecting machine 2, an elongated packing table 3, an empty pan conveyor 4, and a pan stacking and removing mechanism 5.

The carton erecting machine 2 may be of a type whereby collapsed carton blanks 6 are placed in a stack, as indicated at 7, and from which the carton blanks are withdrawn one at a time, erected into cartons 8 and discharged in successive order onto the packing table 3.

The packing or work table 3 extends from the discharge end of the carton erecting mechanism 2 and includes longitudinal members 9 and 10 that support there-between a table top 11. The longitudinal members 9 and 10 are carried with the table at a convenient working height on legs 12 which may be provided with casters 13.

Also carried between the longitudinal members of the work table is an endless conveyor 14. The conveyor 14 The conveyor 14 illustrated in the present drawings includes spaced apart side chains 15 and 16 that operate over pairs of sprockets 18 at the respective ends of the work table. The sprockets are carried on transverse shafts 20 that are suitably journaled in the longitudinal members of the work table. Also extending along the work table at the rear side of the innermost conveyor chain is a relatively narrow endless belt 21 operating over pulleys 22 and 23, suitably mounted on the frame.

The shaft 20 at the delivery end of the machine constitutes the driving shaft for the conveyor 14 and carries a sprocket 24. Operating over the sprocket 24 is a chain 25 that is driven from a sprocket 26 of a speed reduction mechanism 27. The speed reduction mechanism 27 is carried on an under framework 28 that is carried below the table top at the delivery end of the machine. The speed reduction mechanism is operated by a motor 29, also mounted on the frame 28, as best shown in Figs. 2 and 7.

The frame of the work table is substantially wider than the conveyor 14 and the belt 21 to also carry the empty pan conveyor 4 which comprises an endless belt 30 on which empty pans 31 are carried to the pan stacking mechanism 5. The belt 30 is carried at the respective ends of the frame on rollers 32 and 33 and at intermediate points on guide rollers 34. The roller 32 constitutes the driving roller and the shaft 35 thereof carries a sprocket 36 that is driven by a chain 37 from a driving unit 38 (Fig. 2). The driving unit 38 may be carried below the delivery end of the belt 30 on an under frame 39.

Extending upwardly from the frame of the work table at a point intermediate the belts 21 and 30 is a pan guide rack 43 comprising spaced apart arms 44 that are rearwardly inclined over the belt 30. The upper ends of the uprights are connected by a longitudinal channel 45, and extending upwardly to the rear of the channel are offset continuations 46 of the inclined arms 44, as best shown in Figs. 1, 2 and 7. Extending transversely of the upper portions of the arms 44 is a guide rail 47 that cooperates with the upper run 48 of the belt 21 to support the baking pans which contain the rolls, as indicated at 49, Figs. 1, 2 and 4. The guide rail 47 extends along the work table from the carton erecting machine toward the delivery end of the work table, but terminates short of the endmost upright 44 to provide an opening or gap 50 through which the emptied pans are dropped onto the upper run 51 of the conveyor 31. The continuations 46 of the arms 44 also carry upper and lower longitudinal guide rails 52 and 53 that cooperate with the channel 45 in supporting stationary pans 54 from which rolls are removed to replace "cripples," as later described. In the machine illustrated, the pan rack is of a length to support two pans for emptying and to leave space adjacent the carton erecting machine for deposit of a filled pan ready to supply the packers as the previously placed pans move along the rack, as shown in Fig. 2. In the illustrated instance the machine is designed to serve two packers, as shown in Fig. 1, and leave room for a third worker who keeps the rack supplied with filled pans.

In order to feed the cartons along the work table, the chains 15 and 16 are connected by cross bars 56 that are spaced apart slightly more than the length of the cartons, as shown in Figs. 1 to 4, inclusive. Since each baking pan contains 24 rolls and 12 rolls are packed in each carton, the work table is of sufficient length to accommodate the cartons to contain the rolls from the two pans from which the packers operate. Therefore, to keep the movement of the cartons in synchronism with movement of the pans, every other cross bar 56 has an upwardly offset extension or finger 57 that extends across a keeper rail 58 into engagement with the respective sides of the pans on the rack. In other words, one pan is moved along the work table in association with two cartons. The keeper rail 58 is to keep the pans from sliding off the belt 21 as they are moved along the rack. It is to be understood that the packing table may be of any desired capacity, however, the arrangement illustrated gives the packers ample time to remove the rolls from a pan and to pack the rolls in the cartons which are available, to assure that the cartons have been filled when they are carried from the delivery end of the machine to the wrapping machine (not shown).

When an empty pan that falls through the opening 50 reaches the end of the belt 30, the pan is transferred to a stack. This is accomplished by a pair of oscillatory supports 60 and 61 for engaging under the outer rim of the sides of a pan as it is being discharged from the belt, and which rock downwardly to drop the pan onto a stacking elevator. The supports 60 and 61 each comprise a longitudinal side bar 62 having a series of rollers 63 along the inner face thereof and on which the rim of the pan engages for rolling movement under influence of a friction wheel 64 that takes up when the pan is released from the return conveyor.

The friction wheel 64 is carried on a transverse shaft 65 carried between parallel arms 66 and 67, the arms 66 and 67 pivoting freely on a fixed shaft 68, so that the friction wheel is always in position to contact a pan and to continue the movement thereof. The fixed shaft 68 also extends transversely and is rotatably supported in bearings 69 and 70 that are carried by side guides 71 and 72. The guides 71 and 72 are spaced apart according to the length of the pans, so that when the pans are discharged from the end of the return conveyor they are guided on to the rollers 63. The friction wheel 64 is driven by a chain 73 operating over a sprocket 74 on the shaft 65 and over a sprocket on the shaft 68. The shaft 68 is driven by a chain 75 suitably connected with the motor unit 38, previously referred to.

The bars 62 of the pan supports 60 and 61 are carried on arms 78 and 79 extending laterally from parallel shafts 80 and 81. The ends of the shafts 80 and 81 are oscillatably supported in transverse plates 82 and 83 which form parts of the frame 84 of the pan stacking mechanism. The forward ends of the shafts 80 and 81 project through the foremost plate 83 and carry gears 86 and 87. Extending tangentially across the upper side of the gear 86 and the under side of the gear 87 is a bar 88 having a series of lower rack teeth 89 meshing with the teeth of the gear 87 and a series of rack teeth 90 on the upper side meshing with the teeth of the gear 86 (Figs. 5 and 11). The shafts 80 and 81 are normally retained in position to hold the rollers of the supports 60 and 61 in position to engage and support the under sides of the rim of a pan when the pan is pushed thereacross. The shafts 80 and 81 are each provided on the projecting ends thereof with depending arms 91 and 92 that are interconnected by a spring 93 so as to hold yieldingly the supports in pan supporting position. However, the supports 60 and 61 are adapted to be rocked in opposite directions against action of the spring 93 to release the pan and drop the pan onto the stack elevator. This is effected by connecting one end of the reciprocatory bar 88 with a piston rod 94 of a pressure actuated cylinder 95, whenever a pressure fluid, such as compressed air, is admitted to the forward end of the cylinder through an air connection 96 (Figs. 5 and 11). The outer end of the piston rod is connected by a yoke 97 with an ear 98 projecting from the reciprocatory bar. The rack is returned to normal position after each actuation thereof by a coil spring 99 sleeved over the piston shaft and having one end bearing against the end of the cylinder and its opposite end against a collar 100 (Fig. 5) that is fixed to the rod 94. The pressure actuated cylinder 95 is pivotally connected at its opposite end to a part on the frame of the machine, as indicated at 101. The rack bar portions of the reciprocatory bar are kept in meshing contact with the gears 86 and 87 by guide rollers 102 and 103 (Fig. 5).

Pressure fluid is admitted to the cylinder 95 responsive to closure of a solenoid valve 104 which is energized by an electric impulse upon closure of a switch 105 whenever a pan is in position to be engaged by the actuating of the switch 105, the switch being suitably mounted in the path of a pan as it completes its movement onto the oscillatory supports.

The elevator mechanism includes spaced apart vertical guides 106 and 107 that are carried by the frame of the machine. The guides 106 and 107 are connected at their respective upper and lower ends thereof by cross bars 108 and 109. Slidably mounted on the guide is an upper cross head 110 that carries spaced apart sprockets 111 that are rotatable on a shaft 112 (Fig. 10). Operating over the sprockets are chains 113 and 114. One end of each chain is connected with a lower cross head 115, while the other end of each chain is connected with a fixed part of the frame, as indicated at 116 (Fig. 6). The lower cross head 115 operates below the level of the table top and carries spaced apart arm 117 and 118, so positioned that the front and rear rims of a released pan drop thereon to begin a stack. The upper cross head 110 is raised and lowered on the guides by a piston rod 119 that is connected with a piston slidably mounted in a pressure cylinder 120. The cylinder 120 has its lower end pivotally connected as at 122 with a cross bar 123 of the frame. Fluid under pressure is exhaused in increments from the lower end of the cylinder to actuate a switch 124, the switch being in position to be contacted by the pan when the pan is fully carried by the oscillatory supports 60 and 61 and in position to drop onto the arms of the elevator. The switch 124 operates a solenoid valve 125 to exhaust the air. The elevator thus moves progressively downwardly with each addition of a pan to the stack (see Fig. 6), until the lowermost pan makes contact with the spaced apart belts 126 of an offtake conveyor 127. As soon as the lowermost pan engages the belts, the pans actuate an electrical switch 128 (Fig. 9), which further releases air from the cylinder until weight of the entire stack is supported on the belts. The downward movement of the elevator arms 117 and 118 continues to clear stops 129 on the outer ends of the arms from the lowermost pan. The stack of pans is then carried by the conveyor belts onto rollers 130 of a mobile truck 131. The truck 131 is adapted to be latched in receiving relation with the elevator by a latch mechanism 132 and which is released by a foot pedal 133. When the stack of pans has cleared the outer ends of the elevator arms, the pans contact an arm 134 of a lever 135 (Fig. 12) having one arm 136 for actuating a switch 137 to close circuit through a solenoid valve 138 (Fig. 11) for admitting a pressure fluid to the lower end of the cylinder 120. The lever 135 also has an arm 139 for actuating a switch 140 to close the exhaust valve 125, so that the pressure fluid is effective in raising the elevator arms 117 and 118 to their upper position. When the elevator arms 117 and 118 are in receiving relation with the return belt, a moving part of the elevator actuates a switch 141 to effect actuation of the valve 138 for shutting off flow of air to the cylinder 120.

The belts 126 operate over driven pulleys 142 on the inner sides of pan guides 143 and 144 and over idle pulleys 145, as best shown in Fig. 9. The intermediate portions of the upper runs 146 of the belts are carried on a series of rollers 147 to support the weight of the pans. The shaft carrying the driving pulleys 142 has a sprocket 148 and operating over the sprocket 148 is a chain 149 that is driven from a motor unit 150. The lever 135 may be mounted on the inner side of the pan guide plate 144, along with the switches 137 and 140.

Assuming that the apparatus is in operation and erected cartons are being delivered onto the table top 11 for movement therealong by the cross bars 56:

One worker, designated "A" in Fig. 1, removes a filled baking pan from a truck that carries it from an oven, and places it on the inclined rack 43, with the bottom edge of the pan supported on the endless belt 21 at the rear side of the rail 58 and the bottom of the pan resting on the rail 47. The worker is careful to place the pan between the fingers 57 of the cross bars, so that the rearmost finger engages the rear edge of the pan and pushes the pan along the rack with the belt 21 moving over the pulleys that support it. As soon as one pan advances to a position in front of the workers "B" and "C," the worker "A" applies another pan, while the workers "B" and "C" are removing the rolls from the pans and placing them in the cartons. The cartons move continuously along in front of the workers at suitable speed to permit easy filling thereof, and the filled cartons are carried off the table top 11 onto a suitable conveyor, not shown, by which they are moved to a wrapping machine, where a transparent wrapper is wrapped around the carton in covering relation with the open top thereof.

It sometimes happens that a roll may be imperfectly formed or be "crippled" when removed from the pan. This can happen because the rolls, being partially baked, have a fragile shell and are easily broken. However, the present method of packing and handling reduces "crippling" to a minimum. To replace "cripples", the worker "A" will place one or two pans of rolls on the upper extension of the rack, so as to provide a supply of rolls for replacing any deformed or damaged rolls, and to provide rolls for completing filling of cartons in case there is no filled pan in position on the lower portion of the rack. The cartons and pans are thus moved along the work table in synchronism.

The empty pans, on reaching the opening 50 in the rack, slide off the rail 47 and drop onto the conveyor belt 30, which returns the empty pans along the length of the table. When an empty pan reaches the delivery end of the belt 30, the pan is projected outwardly from the end of the belt with the side edges of the pan bearing on the rollers 63 of the supports 60 and 61. As the weight of the pan moves off the belt 30, the forward movement thereof might tend to lag, but the movement thereof is maintained by contact of the driven friction roller 64. As soon as the forward edge of the pan engages the operating arm of the switch 105, the switch effects actuation of the solenoid valve 104 to admit air under pressure into the cylinder 95 to effect reciprocation of the bar 88 in one direction and cause the gear 87 to rotate in a clockwise direction and the gear 86 in a counterclockwise direction (Figs. 5 and 11). This causes the supports 60 and 61 to swing downwardly and outwardly from under the side edges of the pan to allow the pan to drop onto the arms 17 and 18 of the elevator, which arms are then in their uppermost position, so that the pan drops only a short distance. After the pan drops between the supports 60 and 61, the switch 124 is effective to actuate the exhaust valve 125 to exhaust sufficient air from the cylinder 120 to lower the arms one increment for accommodating a following pan. After actuation of the cylinder 95, the spring 99 is effective to move the bar 88 in the opposite direction and rotate the gear 87 in a counterclockwise direction and the gear 86 in a clockwise direction, to again raise the supporting members 60 and 61 to receive the next pan from the conveyor belt 30.

The operation continues with the elevator being lowered with the application of each pan until the lowermost pan passes the switch 128, whereupon all of the air is exhausted from the cylinder 120 and the elevator arms gradually settle until the side edges of the lowermost pan rest upon the upper runs 156 of the belts 126. The elevator arms continue their movement until the lugs 129 on the ends thereof move below the bottom pan, whereupon the transverse conveyor belts 126 become effective in moving the stack of pans onto the truck 131. The truck has been previously moved into position and engaged by the latch 132 to hold it in receiving relation with the pan stacking mechanism. As the stack of pans passes over the arm 134 of the lever 135, the arm rocks downwardly to cause the lever 135 to actuate the switches 137 and 140 to effect closure of the exhaust valve and opening of the air supply valve for admitting air to the lower end of the cylinder 120 to return the elevator to its original position. When the truck is filled with stacks of pans, it may be released by stepping on the pedal 133 so that it may be rolled out of position and an empty truck rolled into position and engaged by the latch 132.

From the foregoing, it is obvious that I have provided an apparatus for facilitating packaging of bakery products such as "Brown 'N Serve" rolls and the like, so that the packaging may be carried out in a fast and orderly manner with a minimum of packers, thereby making it possible to package the rolls in large quantities in the small time allotted to such work. It is also obvious that the empty pans are handled substantially automatically and stacked ready for reuse.

What I claim and desire to secure by Letters Patent is:

1. An apparatus for facilitating boxing of bakery products such as rolls, including a carton conveyor for carrying cartons through a packing station, a rack extending along the conveyor for supporting baking pans with the rolls therein, means on the carton conveyor for pushing the cartons along the rack, said means having portions extending into contact with the baking pans on the rack to move the baking pans along the rack progressively with movement of the cartons while the rolls are being removed from the baking pans and placed in the cartons, and means for removing the empty baking pans from the rack.

2. An apparatus for facilitating boxing of bakery products such as rolls, including a carton conveyor for carrying cartons in spaced apart relation through a packing station at which an operator is stationed along one side of the conveyor, a pan rack extending along the other side of the conveyor and inclining away from the said one side of the conveyor for supporting a baking pan in which the rolls are contained, means on the carton conveyor for engaging the cartons and having a part extending in the direction of the rack for contacting the baking pan on said rack to move the baking pan along with the cartons while the rolls are removed from the baking pan and placed in the cartons, said rack having an opening therethrough for discharging the empty baking pan, and a conveyor extending from said opening for receiving the empty pan, and means at the discharge end of the last named conveyor for stacking the baking pans.

3. An apparatus for facilitating boxing of bakery products such as rolls, including a carton conveyor for carrying cartons in spaced apart relation through a packing station at which an operator is positioned along one side of the carton conveyor, a pan conveyor extending along the opposite side of the first named conveyor, a pan rack extending along the carton conveyor and inclined away from the carton conveyor and over the pan conveyor, said pan rack being adapted to support baking pans on edge and inclined away from the operator, and means on the carton conveyor and having portions extending in the direction of the rack for engaging the baking pans in said rack for moving the baking pans along the rack with the movement of said cartons to facilitate removal of the rolls by the operator and placing of the rolls in the cartons, said pan rack having an opening for passing the empty pans from the pan rack onto the pan conveyor.

4. An apparatus for facilitating boxing of bakery products such as rolls, including a carton conveyor for carrying cartons in spaced apart relation through a packing station at which an operator is positioned along one side of the carton conveyor, a pan conveyor extending along the opposite side of the first named conveyor, a pan rack extending along the carton conveyor and inclined away from the carton conveyor and over the pan conveyor, said pan rack being adapted for supporting baking pans containing the rolls, means on the carton conveyor and having fingers projecting substantially to the rack for engaging the baking pans to move the baking pans along the pan rack with movement of said cartons, movable means separately from the carton conveyor and extending along said rack below said fingers for supporting lower edges of the baking pans to assist the fingers in moving the pans along the pan rack, means for operating the carton conveyor, said rack having an opening for passing the empty pans onto the pan conveyor, and means at the delivery end of the pan conveyor for stacking the empty baking pans 5. An apparatus for facilitating boxing of bakery products such as rolls, including a work table, a conveyor including endless chains extending along opposite sides of the work table, bars connecting the chains for pushing cartons along the work table, a movable belt extending along one side of the work table, a pan supporting rack extending along said side of the work table above said movable belt for cooperating with the said movable belt for supporting baking pans in inclined position with the bottom edges of the baking pans bearing upon the movable belt, and fingers on alternate bars and extending over the belt to engage the baking pans therebetween for moving the baking pans along with the cartons.

6. An apparatus for facilitating boxing of bakery products such as rolls, including a work table, a conveyor including endless chains extending along the work table, bars connecting the chains for pushing cartons along the work table, movable means extending along one side of the work table parallel with the work table, a pan supporting rack extending along said side of the work table above the movable means for supporting baking pans in inclined position with the bottom edges of the baking pans bearing upon the movable means, fingers on alternate bars and extending over the movable means to engage the baking pans for moving the pans along with the cartons, and a stationary rail carried by the rack above the path of the pans which have edge support on the movable means to provide a stationary support for baking pans in an inclined stationary position containing rolls for replacing imperfect rolls removed from the baking pans that are moved along the rack.

7. In an apparatus for facilitating boxing of bakery products such as rolls, a carton conveyor for carrying cartons in spaced apart relation through a packing station at which an operator is positioned along one side of the carton conveyor, a pan conveyor extending along the opposite side of the first named conveyor, a pan rack extending along the carton conveyor and inclined over the pan conveyor for supporting baking pans containing the rolls, means on the carton conveyor for engaging the baking pans to move the baking pans along the rack with the movement of said cartons, said rack having an opening for passing the empty baking pans therethrough onto the pan conveyor, means at the delivery end of the pan conveyor for stacking the empty pans, and means for discharging the stack of pans from the stacking means.

8. In an apparatus for facilitating boxing of bakery products such as rolls, a carton conveyor for carrying cartons in spaced apart relation through a packing station at which an operator is positioned along one side of the carton conveyor, and means for handling the pans containing the rolls wherein said pan handling means includes a pan conveyor extending along the opposite side of the first named conveyor, a pan rack extending along the carton conveyor and inclined over the pan conveyor for supporting baking pans containing the rolls, means on the carton conveyor for engaging the baking pans to move the baking pans along the rack with the movement of said cartons, said rack having an opening for dropping the empty baking pans onto the pan conveyor, an elevator at the delivery end of the pan conveyor, means for operating the elevator in increments in a downward direction to carry a stack of pans to discharge position, supports for engaging opposite side edge portions of the pans and extending from the delivery end of the pan conveyor for receiving the pans one at a time, means carrying the supports into and out of supporting position to drop a pan received thereby onto pans carried by the elevator, and means responsive to movement of a pan onto the supports for actuating the supports 9. In an apparatus for facilitating boxing of bakery products such as rolls, a carton conveyor for carrying cartons in spaced apart relation through a packing station at which an operator is positioned along one side of the carton conveyor, and means for handling the pans containing the rolls wherein said pan handling means includes a pan conveyor extending along the opposite side of the first named conveyor, a pan rack extending along the carton conveyor and inclined over the pan conveyor for supporting baking pans containing the rolls, means on the carton conveyor for engaging the baking pans to move the baking pans along the rack with the movement of said cartons, said rack having an opening for dropping the empty baking pans onto the pan conveyor, an elevator at the delivery end of the pan conveyor, means for operating the elevator in increments in a downward direction to carry a stack of pans to discharge position, supports for engaging opposite side edge portions of the pans and extending from the delivery end of the pan conveyor for receiving the pans one at a time, means between said supports for engaging the top of a pan carried by said supports to continue movement of a pan onto the supports, means carrying the supports into and out of supporting position to drop a pan received thereby onto pans carried by the elevator, means responsive to movement of a pan onto the supports for actuating the supports, and means responsive to dropping of the pan for effecting actuation of the elevator in said downward direction.

10. In an apparatus for facilitating boxing of bakery products such as rolls, a carton conveyor for carrying cartons in spaced apart relation through a packing station at which an operator is positioned along one side of the carton conveyor, and means for handling the pans containing the rolls wherein said pan handling means includes a pan conveyor extending along the opposite side of the first named conveyor, a pan rack extending along the carton conveyor and inclined over the pan conveyor for supporting baking pans containing the rolls, means on the carton conveyor for engaging the baking pans to move the baking pans along the rack with the movement of said cartons, said rack having an opening for passing the empty baking pans therethrough onto the pan conveyor, transverse spaced apart conveyors at the delivery end of the pan conveyor and located at a lower level, said transverse conveyors being spaced apart according to the pans to support opposite side edges of the pans thereon, an elevator including spaced horizontal arms movable between the pan conveyor and the transverse conveyors, means for operating the elevator in increments in a downward direction to carry a stack of pans onto the transverse conveyors to discharge the stack of pans, supports for engaging the other opposite edges of the pans and extending from the delivery end of the pan conveyor for receiving the pans one at a time, means carrying the supports into and out of the supporting position to drop the pan received thereby onto the stack of pans, and means responsive to movement of a pan onto the supports for actuating the supports.

11. In an apparatus for facilitating boxing of bakery products such as rolls, a carton conveyor for carrying cartons in spaced apart relation through a packing station at which an operator is positioned along one side of the carton conveyor, and means for handling pans containing the rolls wherein said pan handling means comprises a pan conveyor extending along the opposite side of the first named conveyor, a pan rack extending along the carton conveyor and inclined over the pan conveyor for supporting baking pans containing the rolls, means on the carton conveyor for engaging the baking pans to move the baking pans along the rack with the movement of said cartons, said rack having an opening for passing the empty baking pans therethrough onto the pan conveyor, transverse spaced apart conveyors at the delivery end of the pan conveyor and located at a lower level, said transverse conveyors being spaced apart according to the pans to support opposite side edges of the pans thereon, an elevator including spaced horizontal arms movable between the pan conveyor and the transverse conveyors, means for operating the elevator in increments in a downward direction to carry a stack of pans onto the transverse conveyors to discharge the stack of pans, supports for engaging the other opposite edges of the pans and extending from the delivery end of the pan conveyor for receiving the pans one at a time, means carrying the supports into and out of supporting position to drop the pan received thereby onto the stack of pans, means responsive to movement of a pan onto the supports for actuating the supports, and means actuated responsive to dropping of the pan for effecting actuation of said elevator operating means.

12. In an apparatus for facilitating boxing of bakery products such as rolls, a carton conveyor for carrying cartons through a packing station at which an operator is positioned along one side of the carton conveyor, a pan conveyor extending along the opposite side of the carton conveyor, a relatively narrow conveyor intermediate the pan and carton conveyors, a pan rack extending along the carton conveyor above the relatively narrow conveyor and inclined over the pan conveyor for supporting baking pans containing the rolls in an inclined position with the pans having edge support on the relatively narrow conveyor, means for actuating said conveyors, said rack having an opening for passing the empty baking pans therethrough to drop onto the pan conveyor, means at the delivery end of the pan conveyor for stacking the empty pans, and means for discharging the stack of pans from the stacking means.

13. In an apparatus for facilitating boxing of bakery products such as rolls, a carton conveyor for carrying cartons through a packing station at which an operator is positioned along one side of the carton conveyor, a pan conveyor extending along the opposite side of the carton conveyor, a relatively narrow conveyor intermediate the pan and carton conveyors, a pan rack extending along the carton conveyor above the relatively narrow conveyor and inclined over the pan conveyor for supporting baking pans containing the rolls in an inclined position with the pans having edge support on the relatively narrow conveyor, means for actuating said conveyors, said rack having an opening for passing the empty baking pans therethrough to drop onto the pan conveyor, means at the delivery end of the pan conveyor for stacking the empty pans, supports extending between the delivery end of the pan conveyor and said stacking means for engaging opposite side edge portions of the pans, means for carrying the supports into and out of supporting position to drop a pan received thereby onto pans carried by the stacking means, and means for discharging the stack of pans from the stacking means.

References Cited in the file of this patent

UNITED STATES PATENTS

| | | |
|---|---|---|
| 1,395,727 | Odermatt | Nov. 1, 1921 |
| 2,081,093 | Miller | May 18, 1937 |
| 2,113,926 | Pierce | Apr. 12, 1938 |
| 2,119,596 | Mintert et al. | June 7, 1938 |
| 2,489,004 | Beaumont et al. | Nov. 22, 1949 |
| 2,801,756 | Vansickle | Aug. 6, 1957 |